Sept. 20, 1966  H. M. VALENTINE  3,273,582

DUAL CIRCUIT PROTECTION VALVE

Filed April 12, 1963

INVENTOR
HARRY M. VALENTINE

BY *Scrivener & Parker*

ATTORNEYS
W-422

United States Patent Office 3,273,582
Patented Sept. 20, 1966

3,273,582
DUAL CIRCUIT PROTECTION VALVE
Harry M. Valentine, Elyria, Ohio, assignor to Bendix-Westinghouse Automotive Air Brake Company, Elyria, Ohio, a corporation of Delaware
Filed Apr. 12, 1963, Ser. No. 272,600
9 Claims. (Cl. 137—111)

This invention relates to fluid pressure systems and fluid pressure responsive valves and more particularly to a system which includes a novel pressure protection valve which is particularly adapted to isolate a part of the system from a source of fluid pressure in the event of severe leakage or other derangement in the system part.

The broad object of the present invention is to provide a fluid pressure system which includes a novel pressure protection valve automatically operable to isolate one of a pair of pressure receivers, for example, fluid pressure reservoirs, which are connected in parallel relationship to a single pressure source such as an air compressor, the valve serving to disconnect a leaking reservoir from the pressure source without affecting the normal supply of fluid to the other reservoir.

More particularly it is an object of the invention to provide a system and valve which is so constructed and arranged that in that event of the failure of one pressure receiver, the valve, after automatically isolating the failed receiver and after the second receiver has been fully charged, will automatically operate to admit fluid pressure to the failed receiver in an endeavor to restore fluid pressure therein without in anyway affecting the normal operation of the second receiver; that is to say, even though the valve is unsuccessful in restoring pressure to the failed receiver, it will nevertheless operate to supply additional pressure to the second receiver whenever the pressure therein falls below a predetermined low value.

Another object of the invention is to provide a system and a valve which in a normal functioning situation provides a means for unloading the compressor after the pressure in both reservoirs is at a predetermined governor setting.

Figure 1:
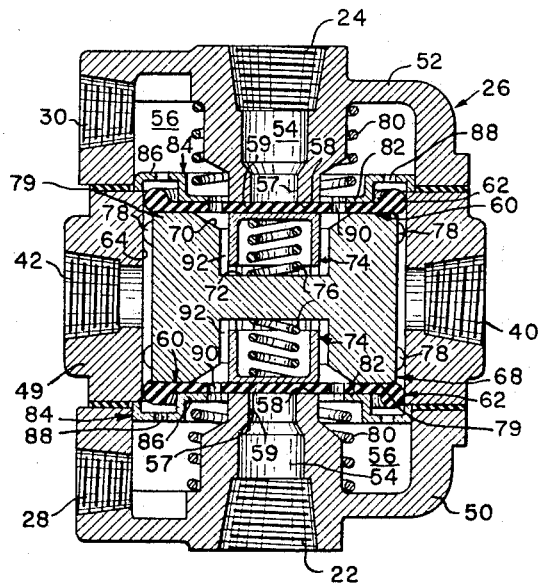
Figure 2:
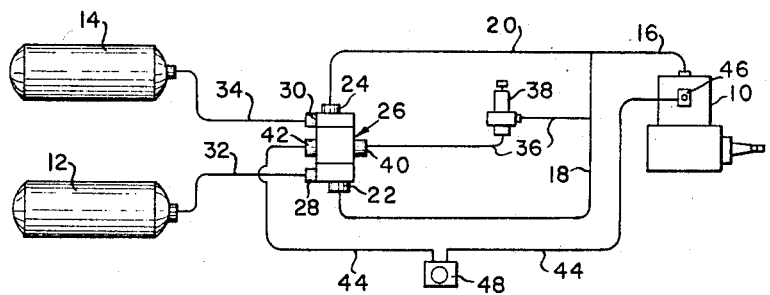

The valve and system of the invention will now be described in detail in conjunction with the accompanying drawings wherein:

FIG. 1 is a vertical cross sectional view of a valve incorporating the features of the invention; and FIG. 2 is a schematic view of a fluid circuit incorporating the valve of the invention.

With particular reference to FIG. 2 which illustrates the system of the invention, the numeral 10 designates an air compressor which may be of a continuously operating type carried in automotive vehicles for charging one or more pressure receivers such as the reservoirs 12, 14 shown, in a fluid pressure braking system. The compressor 10 has the usual dicharge conduit 16 which in the system of FIG. 2 is divided into two branch conduits 18, 20 leading respectively to inlet ports 22, 24 at opposite ends of a valve member 26 which incorporates the features of the invention and will hereinafter be described in detail. The valve member 26 has a pair of delivery ports 28, 30 respectively connected to the reservoirs 12, 14 by way of conduits 32, 34.

Connected to the discharge of the compressor 10 is an auxiliary or control conduit 36 containing therein a conventional pressure regulator valve 38 which is opened in response to a predetermined high pressure, say 100 p.s.i., on the upstream side of the valve to permit the passage of fluid through the conduit 36 to a third inlet or control port 40 in the side of the valve 26. The pressure regulating valve 38, as is usual, is adapted to close at a pressure less than the opening pressure, say 90 p.s.i., in order to disconnected the control port 40 from the compressor discharge conduit when the pressure in the latter falls to the established low value.

Connected to an outlet port 42, also in the side of valve 26, is an unloader conduit 44 leading to the compressor unloader 46 and containing a conventional fluid pressure governor 48 which desirably opens at a pressure, say 105 p.s.i., which is greater than the opening pressure of the pressure regulating valve 38 and closes and relieves the pressure in the unloader at a pressure, say 85 p.s.i., which is less than the closing pressure of the pressure regulating valve 38. The desirability of the pressure relationships at which the pressure regulating valve and the governor respond will become apparent as the description proceeds.

Referring now to FIG. 1, it will be observed that the valve 26 of the invention is composed of an intermediate casing member 49 and identical lower and upper casing members 50, 52 containing respectively the aforementioned inlet ports, 22, 24 and delivery ports 28, 30. Because the casing members 50, 52 are identical, hereinafter the same reference characters refer to identical parts. Each of the upper and lower casing members is divided into inlet and delivery cavities 54, 56 connected to the respective inlet and delivery ports. Each inlet cavity 54 is communicated with its associated delivery cavity through a passage 57 which terminates in a valve seat 58 controlled by the center part 59 of a cup diaphragm 60 having peripheral flanges 62 extending in the direction of the delivery cavities 56 and engaging the sidewall of a central bore 64 in the intermediate casing member 49.

The central bore 64 communicates with the aforementioned inlet and outlet control ports 40, 42, and slidingly received within the bore 64 is a reciprocating plunger or piston 68 whose opposite ends contain conical recesses 70 terminating in fluted cavities 72 slidingly receiving plungers 74 urged by light springs 76 against the underside of the central parts 59, of the diaphragms 60 to urge these into sealing engagement with the valve seats 58.

The plunger 68 is spaced from the sidewall of the bore 64 by a plurality of upper and lower, circumferentially spaced flutes 78 which serve to insure that the inlet and outlet ports 42, 40 are at all times in free communication with each other around the outer surface of the plunger. The plunger 68 is retained centered in the bore and the outer parts of the diaphragms 60 are retained in sealing engagement with annular end parts 79 of the plunger intermediate the conical recesses 70 and the margin of the flanges 62 by means of a pair of pre-loaded springs 80 interposed between fixed abutments in the delivery cavities 56 and the inner annular flanges 82 of the guide members 84 slidingly received in the delivery cavities 56 as shown. The guide members 84 are stamped or otherwise shaped to afford outer raised flanges 86 having perforations 88 therethrough communicating the delivery cavities 56 with the upper surfaces of the peripheral parts of diaphragms 60. The undersides of the central parts 59 of the diaphragms are also communicated with the delivery cavities 56 by way of perforations 90 through the diaphragms which communicate with the conical recesses 70 and also with the undersides of the plungers 74 by way of the flutes 92 on the sidewalls of the cavities 72 so that any fluid pressure existing in the cavities 56 will operate on the plungers 74 to aid the springs 76 in urging the plungers against the underside of the central parts of the diaphragms to insure that these are retained at all times in sealing engagement with the valve seats 58 whenever the pressure in the delivery cavities 56 equals or exceeds the pressure in the inlet cavities 54; that is to say, the central parts of the diaphragms function as check valves to control the one-way flow of fluid from the inlet to the delivery cavities while preventing flow in the reverse direction.

In operation, let it be first assumed that the entire system is in working condition and no leaks or other derangement exist in the system. Under these circumstances, when the compressor is operated it delivers fluid simultaneously to the lower and upper inlet ports 22, 24 of the valve 26. As the fluid is received in the inlet cavities 54 it operates on the central parts 59 of the diaphragms 60 to depress the plungers 74 against the force of the light springs 76 so that the diaphragms are moved away from the valve seats 58 permitting fluid to flow into the delivery cavities 56 and thence to the reservoirs 12, 14 by way of the delivery ports 28, 30 and conduits 32, 34. As the pressure builds up in the reservoirs and hence in the delivery cavities 56 it operates through the perforations 88 in the outer flanges 86 of the guide members 84 to urge the peripheral flanges 62 of the cup diaphragms into tight sealing engagement with the side wall of the bore 64 to prevent the flow of fluid into the bore and also to cause tight sealing engagement of the intermediate sections 79 and the diaphragms 60 to prevent the leakage of the pressure building up through the perforations 90 on the under side plungers 74. The pressure continues to build up in the reservoirs 12, 14 until a pressure of 100 p.s.i. is reached whereupon the pressure regulating valve opens to communicate the inlet and outlet control ports 40, 42 in valve 26 with the discharge of the compressor by way of conduits 16, 36. As previously explained, the fluid from the pressure regulating valve flows from the inlet port 40 to the outlet port 42 substantially unimpeded around the outer surface of the plunger member 68 from whence it flows by way of conduit 44 to the inlet side of the governor 48 where further flow is temporarily blocked until system pressure has risen to the cut-out pressure of 105 p.s.i. of the governor at which point the governor opens to permit unloading pressure to flow to the unloader 46 of the compressor whereupon no further fluid is delivered to the system.

Assume now that the fluid pressure in either one of the reservoirs, say reservoir 12, commences to be depleted. As the pressure in the reservoir falls, the pressure in cavity 64 flows by the flange 62, of the lower diaphragm 60, through the perforations 88 into the cavity 56 and hence to the reservoir 12. It is noted that the pressure in the conduits 16, 20, 18, 36 and 44 is equalized so long as the pressure is above 100 p.s.i. On receding to 90 p.s.i. the regulating valve 38 closes, trapping 90 p.s.i. in the conduits 16, 20, 18 and the upstream portion of conduit 36. The pressure in downstream conduits 36 and 44 flows to reservoir 12 in an effort to supply the demand; as the pressure in cavity 64 falls below that in upper cavity 56 the pressure on the outer periphery of upper diaphragm 60 acts on the plunger 68 to move it downwardly until it stops on the lower plunger 74 to positively block off the lower inlet cavity 54. When the pressure in the cavity 64 and conduit 44 drops to 85 p.s.i. the governor cuts in and the compressor begins to build up the system pressure, recharging first the reservoir 14 to 100 p.s.i., if required, and the next causing the regulator valve 38 to open and supply fluid to restore the pressure in reservoir 12. When the pressure in cavity 64 approaches 100 p.s.i. the plunger 68 assumes its original normal position and both reservoirs are recharged via the upper and lower valves 58 as before while the conduit 44 downstream of the governor 48 is simultaneously charged via conduit 36 and cavity 64 to the cut-out pressure 105. It is to be noted that if at any time there is sufficient pressure differential between the upper and lower delivery cavities 56 the plunger 68 is moved to block-off the inlet cavity 54 which supplies the reservoir having the lesser pressure, and any pressure that is routed to the latter reservoir is supplied from the cavity 64 after the first reservoir is recharged to 100 p.s.i. As soon as the pressure in governor control conduit 44 has fallen to the cut-in pressure of 85 p.s.i. the governor operates to relieve the pressure in the unloader 46 so that the compressor can again continue to deliver pressure to the system. If, in the foregoing example, no pressure was depleted from the second reservoir 14 so that this pressure was retained at 105 p.s.i., when the compressor commences to deliver pressure in response to depletion of pressure in reservoir 12, additional pressure is not delivered to reservoir 14 but rather the higher pressure in reservoir 14 acts downwardly on the upper diaphragm 60 to move the plunge 68 toward the lower valve seat 58 until the upper edge of the lower central plunger 74 bottoms on the floor of the recess 72 whereupon the central part of the lower diaphragm is moved into tight sealing engagement with the lower valve seat 58 so that no pressure can flow by way of lower inlet port 22 to the depleted reservoir 12; that is to say, no fluid can flow by way of either inlet port, 22 or 24, to either of the respective reservoirs. Under these conditions, the pressure in the discharge conduit of the compressor immediately builds up to the opening pressure of 100 p.s.i. of the pressure regulating valve so that fluid now flows into the inlet control port 40 and to the governor 48 but not beyond because the pressure has not yet reached 105 p.s.i., which is the opening pressure of the governor. Hence the output of the compressor has only one course of escape which is by way of central bore 64, past the flange 62 of the lower diaphragm and thence to the reservoir 12 through the lower delivery port 28 until the pressure in the reservoir has risen to 105 p.s.i. whereupon the governor 48 cuts-out and the pressure is unloaded, with the pressure in both reservoirs equalled at 105 p.s.i.

Assume now that because of leakage all of the pressure in reservoir 12 is rapidly depleted. Under these circumstances, the action of the valve 26 is substantially identical to the above described action where the pressure in reservoir 12 falls to some normal level below the pressure in the reservoir 14; that is to say, the plunger 68 is immediately moved down into tight sealing engagement with the lower valve seat 58 so that the lower inlet port no longer functions as a fluid passage. Assume, however, that pressure in the reservoir 14 falls below the cut-in pressure of the governor 48. Under these circumstances, fluid pressure trapped in the upstream side of the governor conduit 44 is relieved past the outer edge of the upper diaphragm 60 to the reservoir 14 so that the governor cuts in and the compressor commences to deliver fluid pressure. This fluid now flows by way of the upper inlet port 24 to the reservoir 14 in the manner previously described until the pressure in the reservoir 14 has risen to the opening pressure of the pressure regulator 38 whereupon fluid again flows to bore 64 and then to the governor 48 by way of conduit 44 where further travel of the fluid is stopped due to the closed condition of the governor. The fluid now being delivered to bore 64 and having no other exit path, flows past the lower diaphragm 60 to the reservoir 12 and endeavors to restore the pressure to reservoir 12. Upon this occurrence, the pressure regulator valve closes due to the relieving of pressure on the downstream thereof, but almost instaneously thereafter the valve again opens due to the rapid buildup of pressure on the upstream side of the valve and additional fluid is delivered to the lower reservoir 12 with the pressure regulating valve cycling continuously in this manner in an endeavor to deliver pressure to reservoir 12 until such time as the pressure in the upper reservoir 14 has receded to a pressure below the closing pressure of 90 p.s.i. of the pressure regulating valve whereupon the latter valve closes and all of the output of the compressor is now delivered to the reservoir 14 in a normal manner until the pressure therein has risen to the opening pressure of the pressure regulating valve which now returns to its effort, through repeated cycling as above explained, to restore pressure to the reservoir 12. Should the fault in the reservoir 12 in some fashion have corrected itself, pressure will eventually be restored in the reservoir and the system will function normally as previously explained. It should be noted, however, that so long as one of the reservoirs remains below the governor cut-out pressure of 105 p.s.i for whatever reason, the governor does not cut-out and the compressor remains loaded and continues to pump fluid in the system.

From the foregoing description the valve of the invention can be summarized as comprising a casing having at it opposite ends two pairs of spaced apart inlet and delivery cavities with a first pair of axially aligned check valves (afforded by the center parts 59 of the diaphragms) controlling the one-way flow of fluid from the inlet to the delivery cavities. In addition, a separate fluid passage, afforded by the bore 64, leads into both of the delivery cavities and has at its opposite end a second pair of check valves (afforded by the peripheral flanges 62 of the diaphragms) for controlling the one-way flow of fluid from the separate fluid passage into the respective delivery cavities whenever the pressure in a cavity is less than the pressure in the passage. Whenever the latter event takes place, fluid pressure responsive means (afforded by one of the diaphragms and the plunger 68) is moved by higher pressure in one of the delivery cavities in the direction of the other cavity to positively close one of the first pairs of check valves associated with the delivery cavity having the lower pressure therein.

So far as the system is concerned, it may be summarized as comprising a pair of pressure receivers connected in parallel to an air compressor and containing in the parallel connections a pair of one way check valves for controlling the flow of fluid from the compressor to the receiver. In addition, the receivers are connected in parallel to the compressor through an auxiliary or control conduit containing a pressure regulator valve and a second pair of one-way check valves for controlling the flow of fluid pressure from the compressor to the receivers whenever the pressure regulator valve opens and pressure in one or the other of the receivers is less than the pressure in the control conduit containing the pressure regulator valve. The system also includes a pressure responsive element having opposed motive areas exposed to the pressure in the respective receivers with mechanical means being actuated by the pressure responsive element to engage and retain closed one or the other of the first set of check valves whenever the pressure in its associated receiver falls to a predetermined level below the pressure of the other receiver whereby the lower pressure receiver can, upon opening of the pressure regulator valve, be supplied with pressure through the auxiliary path afforded by the control conduit which includes one of the second pair of check valves. In addition, the compressor may be provided with an unloader connected to the control conduit, a governor being provided in the control conduit in series with the pressure regulator valve to control the loading and unloading of the compressor subsequent to the opening and closing of the pressure regulator valve, as above explained.

It will be understood by those skilled in the art that the valve and system of the invention is susceptible of a variety of changes and modifications without however departing from the scope and spirit of the appended claims.

What is claimed is:

1. A fluid pressure responsive control valve comprising a casing having two pairs of spaced apart inlet and delivery cavities and ports, a pair of axially aligned passages communicating each inlet cavity with its delivery cavity, a pair of opposed axially aligned check valves for controlling the one-way flow of fluid through said passages from said inlet to said delivery cavities, a third inlet port in said casing, a fluid conduit in said casing connected to said third inlet port and communicating at its opposite ends with the respective delivery cavities, a second pair of opposed check valves in said conduit for controlling the one-way flow of fluid from said conduit to the respective delivery cavities, bore means in said casing in axial alignment with said first pair of check valves and communicating at its opposite ends with said delivery cavities, a fluid pressure responsive element in said bore means having opposed motive areas exposed to the pressure in the respective delivery cavities, and means carried by said pressure responsive element on opposite sides thereof for engaging said first mentioned check valves to positively retain one or the other closed whenever the pressure responsive element is moved theretowards in response to pressure in one delivery cavity which is greater by a predetermined amount than the pressure in the other delivery cavity.

2. A fluid pressure responsive control valve comprising a casing having two pairs of spaced apart inlet and delivery cavities and ports, a pair of fluid passages communicating each inlet cavity with its delivery cavity, a third inlet port in said casing, a fluid conduit in said casing connected to said third inlet port and communicating at its opposite ends with the respective delivery cavities, a pair of opposed check valves in said conduit for controlling the one-way flow of fluid from said conduit to the respective delivery cavities, fluid pressure responsive means in said casing having opposed motive areas exposed to the pressure in the respective delivery cavities, a pair of valve elements for controlling the fluid passages between said inlet and delivery cavities, and means cooperating with said fluid pressure responsive means and said valve elements for closing one or the other of said passages to prevent the flow of fluid therethrough to its associated delivery cavity upon operation of said fluid pressure responsive element in response to higher pressure in the other delivery cavity.

3. A fluid pressure responsive control valve comprising a casing having two pairs of spaced apart inlet and delivery cavities and ports, a pair of fluid passages communicating each inlet cavity with its associated delivery cavity, opposed axially aligned valve seats at the ends of said passages, a bore in said casing in axial alignment with said valve seats, a pair of spaced cup diaphragms at opposite ends of said bore separating the interior thereof from said delivery cavities, said diaphragms having center parts for sealingly engaging said valve seats and having peripheral sealing flanges engaging the side wall of said bore and extending in the direction of said delivery cavities, a plunger axially slidable in said bore and disposed between said diaphragms, said plunger having opposed annular parts engaging the respective diaphragms intermediate the peripheral flanges and the central, valve seat engaging parts, a third inlet port in said casing, a fluid conduit in said casing connected to said third inlet port and communicating at its opposite ends with the respective delivery cavities, and means cooperating with said plunger to move the center parts of the respective diaphragms into tight sealing engagement with one or the other of said valve seats to prevent the flow of fluid from the associated inlet cavity to its delivery cavity when the plunger is moved towards said valve seat in response to a predetermined higher pressure in the other delivery cavity acting on its associated diaphragm.

4. The control valve of claim 3 including resilient means acting on the central parts of said diaphragms to retain the confronting faces thereof normally in light engagement with said valve seats and including fluid passage means communicating the opposite faces of the central parts of said diaphragms with said delivery cavities whereby the pressure in said cavities acts in concert with said resilient means to prevent at all times the reverse flow of fluid from said delivery cavities into said inlet cavities.

5. The control valve in accordance with claim 4 wherein the peripheral flanges of said diaphragms are moved out of sealing engagement with the side wall of said bore when the pressure force supplied to said third inlet port and acting on the peripheral flanges of said diaphragm in the direction of the delivery cavities exceeds the pressure force in said delivery cavities acting on said peripheral parts in the direction of said bore.

6. The control valve in accordance with claim 3 including resilient means acting in opposite direction on said plunger to retain the same normally centered in said bore.

7. A fluid pressure system comprising a fluid compressor and two reservoirs connected in parallel with said compressor, a pair of check valves in the connection between said compressor and said reservoirs for controlling the one-way flow of fluid from said compressor to said reservoirs, a fluid pressure responsive element between said check valves having opposed motive areas, fluid passage means communicating said opposed motive areas with the respective reservoirs, said element being movable in response to the greater of the pressure in said reservoirs, mechanical means operative by said fluid pressure responsive element to bear on the check valves to positively retain one or the other thereof closed whenever the pressure in its associated reservoir falls below a predetermined level relative to the pressure in the other of said reservoirs, an auxiliary control conduit connecting said reservoirs in parallel with said compressor, a second pair of check valves in the auxiliary control conduit between each of the respective reservoirs and said compressor for controlling the one-way flow of fluid from said compressor to said reservoirs whenever the pressure in said auxiliary conduit is greater than the pressure in either of said reservoirs, and a normally closed pressure regulator valve in said auxiliary conduit between said compressor and said second pair of check valves, said pressure regulator valve being opened in response to a predetermined high pressure in the conduit between said regulator valve and said compressor.

8. The fluid pressure system of claim 7 wherein said compressor includes an unloader connected to said control conduit, and a governor connected in series in said auxiliary conduit between said pressure regulator valve and said unloader.

9. The fluid pressure system of claim 8 wherein said pressure regulator valve opens at a predetermined high pressure and closes at a predetermined pressure less than the opening predetermined pressure less than the opening pressure, and wherein said governor responds to a predetermined high pressure greater than the opening pressure of said pressure regulator valve to connect said control conduit with said unloader and responds to a predetermined low pressure less than the closing pressure of said pressure regulating valve to disconnect unloader from said auxiliary conduit.

References Cited by the Examiner
UNITED STATES PATENTS

| Re. 25,211 | 7/1962 | Fellberg | 137—118 |
| 2,710,620 | 6/1955 | Watson | 137—118 |
| 3,173,446 | 3/1965 | Mitchell | 137—498 |
| 3,196,890 | 7/1965 | Brandenberg | 137—112 |

WILLIAM F. O'DEA, *Primary Examiner.*

ISADOR WEIL, *Examiner.*

D. ZOBKIW, *Assistant Examiner.*